US008843472B2

(12) United States Patent
Katz et al.

(10) Patent No.: US 8,843,472 B2
(45) Date of Patent: Sep. 23, 2014

(54) RECOVERY OF INCONSISTENT DATA IN DATABASES

(75) Inventors: Daniel Katz, Kfar Vradim (IL); Eran Raichstein, Yomeam Illit (IL); Amihay Schwarz, Haifa (IL); Raul D. Segal, Zichron Yaacov (IL)

(73) Assignee: International Business Machines Corporation, Armonk, NY (US)

( * ) Notice: Subject to any disclaimer, the term of this patent is extended or adjusted under 35 U.S.C. 154(b) by 380 days.

(21) Appl. No.: 13/270,484

(22) Filed: Oct. 11, 2011

(65) Prior Publication Data

US 2013/0091110 A1  Apr. 11, 2013

(51) Int. Cl.
*G06F 17/30* (2006.01)

(52) U.S. Cl.
USPC .............................. 707/711; 707/741; 707/797

(58) Field of Classification Search
CPC .............. G06F 17/30; G06F 17/30286; G06F 17/30312; G06F 13/30321; G06F 13/30327; G06F 13/30336
USPC .......... 707/711, 741, 777, 796, 797, 696, 755
See application file for complete search history.

(56) References Cited

U.S. PATENT DOCUMENTS

| | | | |
|---|---|---|---|
| 6,122,645 A * | 9/2000 | Bohannon et al. | ..... 707/999.202 |
| 6,513,028 B1 | 1/2003 | Lee et al. | |
| 7,383,276 B2 | 6/2008 | Lomet | |
| 2011/0066937 A1 | 3/2011 | Loeser | |

OTHER PUBLICATIONS

Hirade, Motoichi et al., "Organization of a File System Using Class Name Expressions Based on a B-Tree", Systems and Computers in Japan, vol. 27, No. 1, Jan. 1996, pp. 1-11.

* cited by examiner

*Primary Examiner* — Vincent F Boccio
(74) *Attorney, Agent, or Firm* — Francis Lammes; Stephen J. Walder, Jr.; Feb R. Cabrasawan

(57) ABSTRACT

A mechanism is provided for efficiently searching a database for data associated with a key value that is unidentifiable in a set of nodes of the database. A request is received to retrieve data from the database, where the request specifies a searched-for key value that is unidentifiable in the set of nodes of the database. The data associated with the searched-for key value is identified in a lowest level node of the database between a current leftmost node and a current rightmost node. A key index is updated in at least one node of the database with the key index value associated with the data and identified from the lowest level node thereby making the searched-for key value identifiable within the at least one node. The data associated with the searched-for key value is then returned to a user.

14 Claims, 7 Drawing Sheets

RECOVERY OF INCONSISTENT DATA IN DATABASES

BACKGROUND

The present application relates generally to an improved data processing apparatus and method and more specifically to mechanisms for recovery of inconsistent data in databases.

Backup and restore mechanisms provide administrators and operators the ability to efficiently and effectively backup and restore files and data on computing systems. Source files and data may be in numerous formats, stored on different mediums and use different compression services for backing up customer data. Much of the data may be stored in various types of databases, one most popular of which is a B+ Tree database. B+ Tree is a type of tree which represents sorted data in a way that allows for efficient insertion, retrieval, and removal of records, each of which is identified by a key. B+ Tree is a dynamic, multilevel index with maximum and minimum bounds on the number of keys in each index segment (usually called a "block" or "node"). In a B+ Tree database, in contrast to a B− Tree database, all records are stored at the leaf level of the tree and only keys are stored in interior nodes.

SUMMARY

In one illustrative embodiment, a method, in a data processing system, is provided for efficiently searching a database for data associated with a key value that is unidentifiable in a set of nodes of the database. The illustrative embodiment receives a request to retrieve data from the database, the request specifying a searched-for key value that is unidentifiable in the set of nodes of the database. The illustrative embodiment identifies the data associated with the searched-for key value in a lowest level node of the database between a current leftmost node and a current rightmost node. The illustrative embodiment updates a key index in at least one node of the database with the key index value associated with the data and identified from the lowest level node thereby making the searched-for key value identifiable within the at least one node. The illustrative embodiment then returns the data associated with the searched-for key value to a user.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

The illustrative embodiments provide mechanisms for recovery of inconsistent backed-up data in databases. If all or some of the nodes have unidentifiable keys because of corruption, the mechanisms of the illustrative embodiments efficiently search nodes of the database where the actual data and full keys exist in order to retrieve data associated with the key and to rebuild key indexes at the node level. That is, it is not uncommon that issues arise during a database quiescent processes that may make a database inconsistent, which may be in any part of the database's life time or just before backing up the database. Many implementations hold the nodes levels in pages of random access memory and manipulate the node levels in distinctive ways that are different than that of the actual data. The actual data contained at the leaf level or lowest level node level is accessed only on hard disk because of the data's size. Thus, pages that contain the nodes levels are sensitive to software and hardware defects of upper layers that manage the database. Therefore, sometimes, the node levels may become corrupted. One of the corruptions is that the keys indexes kept in the node levels become unidentifiable. This prevents navigation with ordinary algorithms when the database becomes corrupted and any backup will be marked as inconsistent. Since data in the nodes of the database exists in numerical order of the nodes, the mechanism identifies a specific data lowest level node where the data is stored by progressively narrowing the search area. Once the data lowest level node containing the data is identified, the data and the associated key value are retrieved and the key indexes at the node levels are updated with the identified key value.

Figure 1:
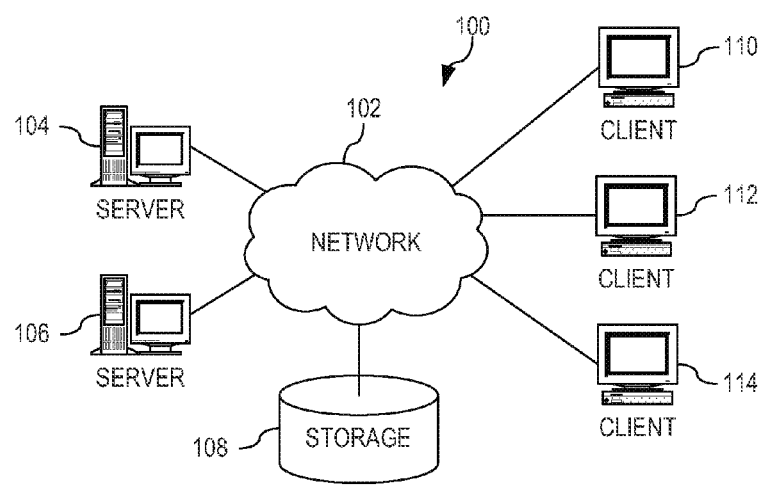
FIG. 1 depicts a pictorial representation of an example distributed data processing system in which aspects of the illustrative embodiments may be implemented.
Figure 2:
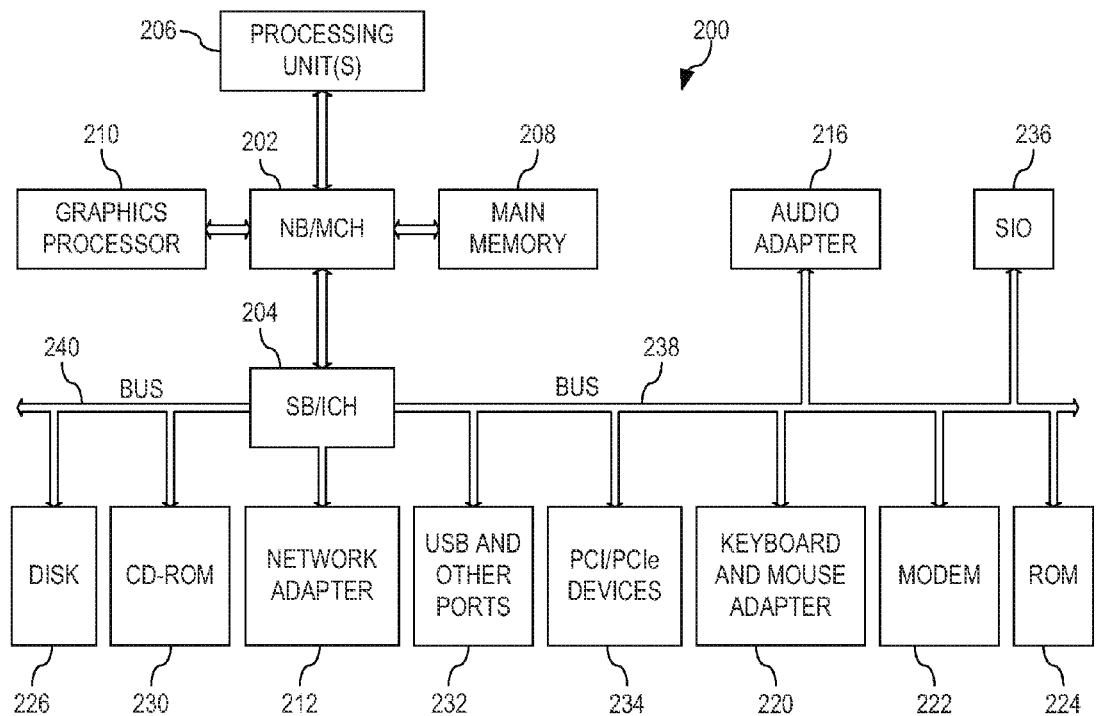
FIG. 2 is a block diagram of an example data processing system in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

FIG. 2 is a block diagram of an example data processing system in which aspects of the illustrative embodiments may be implemented. Data processing system 200 is an example of a computer, such as client 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft Windows 7 (Microsoft and Windows are trademarks of Microsoft Corporation in the United States, other countries, or both). An object-oriented programming system, such as the Java programming system, may run in conjunction with the operating system and provides calls to the operating system from Java programs or applications executing on data processing system 200 (Java is a trademark of Oracle and/or its affiliates.).

As a server, data processing system 200 may be, for example, an IBM® eServer™ System p® computer system, running the Advanced Interactive Executive (AIX®) operating system or the LINUX operating system (IBM, eServer, System p, and AIX are trademarks of International Business Machines Corporation in the United States, other countries, or both, and LINUX is a registered trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

The subsequent description is directed to B+ Tree databases as one exemplary type of database with which the mechanism of the illustrative embodiments are intended to operate. However, the illustrative embodiments are in no way limited to B+ Tree databases. That is, the illustrative embodiments are intended to operate with any type of database that has a tree like structure. When the mechanisms of the illustrative embodiments detect unreliable or missing computed key values in B+ Tree node levels, the mechanisms parse the B+ Tree to find a reliable key index in the B+ Tree lowest level nodes. That is, the full key value exists at the data level along with the data, which is always at the lowest level nodes of a B+ Tree in a numerically ordered fashion. Thus, the mechanisms of the illustrative embodiments search down from a current node to a lowest level node or leaf to find a key value and data associated with the key value that exist in the current node when the computed key value is unreliable or missing.

Figure 3:
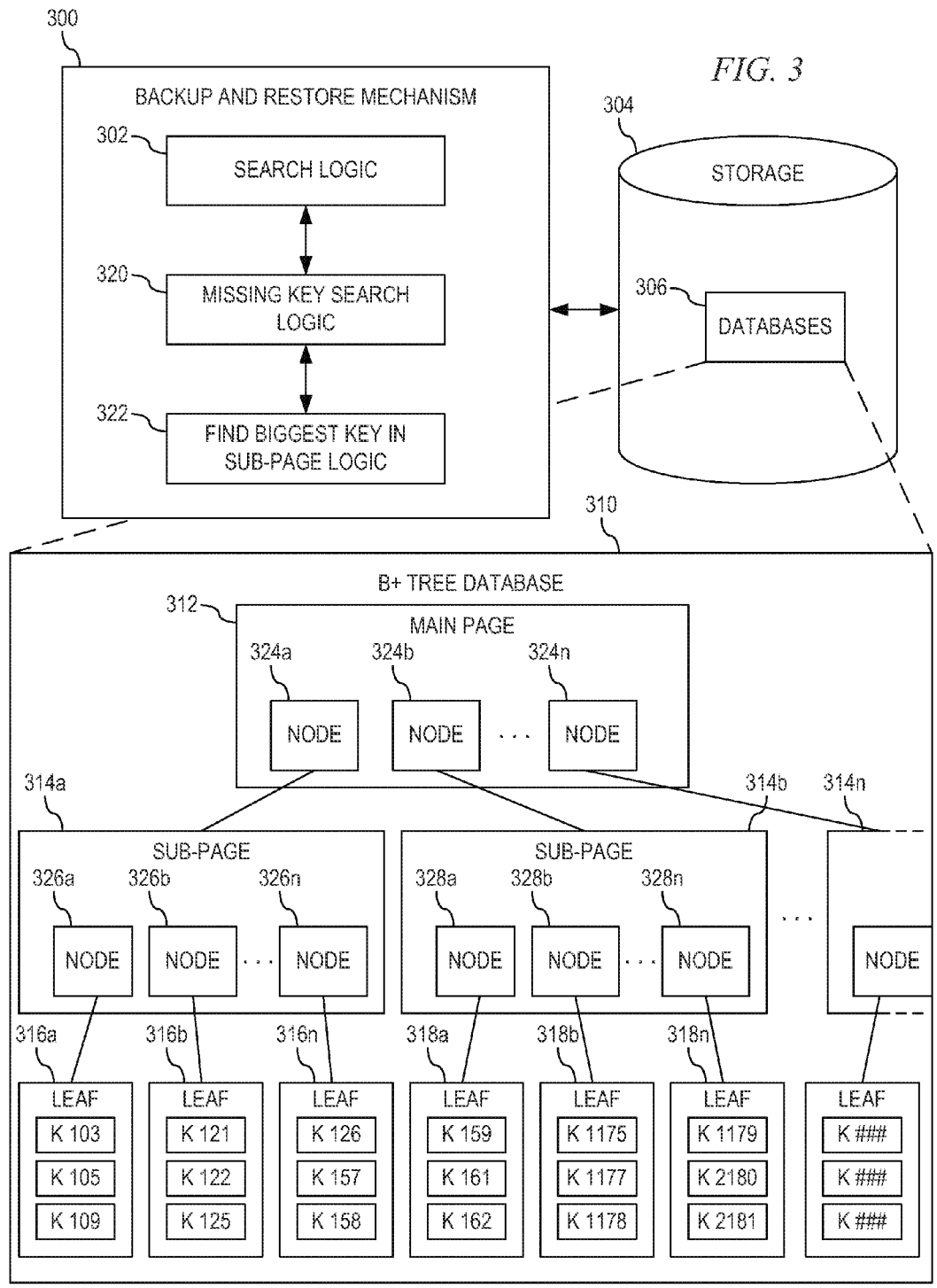
FIG. 3 depicts a functional block diagram of a mechanism for recovery of inconsistent backed-up data in B+ Tree databases in accordance with an illustrative embodiment.

FIG. 3 depicts a functional block diagram of a mechanism for recovery of inconsistent backed-up data in B+ Tree databases in accordance with an illustrative embodiment. Backup and restoration mechanism 300, which may be executed by a processing unit such as processing unit 206 of FIG. 2, comprises search logic 302 coupled to storage 304. Storage 304 comprises databases 306 some of which are B+ Tree databases, such as B+ Tree database 310. B+ Tree database 310 comprises, for example, main page 312, sub-pages 314a, 314b, and 314n, and data leaves 316a, 316b, 316n, 318a, 318b, and 318n. Sub-page 314a comprises nodes 326a, 326b, and 326n and sub-page 314b comprises nodes 328a, 328b, and 328n.

The numerical value of the keys in nodes of main page 312 and nodes of sub-pages 314a, 314b, and 314n is ordered at each level of the B+ Tree database 310 with, in this example, the smallest key value in the leftmost place. However, one of ordinary skill in the art will recognize that, while in the illustrated example the smallest key is in the leftmost place, in other implementations the smallest key may be in the rightmost place. That is, the illustrative embodiments operate as long as the nodes or leaves within each page or leaf are ordered in a lowest to highest or a highest to lowest order. Each level of main page 312, sub-pages 314a, 314b, and 314n, and leaves 316a, 316b, 316n, 318a, 318b, and 318n comprises 1 to n nodes or leaves, the $n^{th}$ node at the rightmost.

During normal operation, search logic 302 efficiently and effectively backups and restores files and data to, for example, B+ Tree database 310 using key indexes in the nodes of main page 312 and sub-pages 314a, 314b, and 314n. However, after numerous database quiescent processes, which may be in any part of the database's life time or just before backing up the database, key indexes in the nodes of main page 312 and sub-pages 314a, 314b, and 314n may become corrupted. In cases when search logic 302 is not able to effectively restore a file or data from storage 304 using the key indexes in the nodes of main page 312 and sub-pages 314a, 314b, and 314n, search logic 302 employs missing key search logic 320 to navigate B+ Tree database 310 within storage 304.

Search logic 302 passes a searched-for key value X to missing key search logic 320 in order to find the respective data. Missing key search logic 320 navigates to main page 312 and applies find biggest key in sub-page logic 322 to find the greatest key value within a sub tree by looking at the data leaves. Find biggest key in sub-page logic 322 navigates to the leftmost node in main page 312, for example, node 324a. Find biggest key in sub-page logic 322 determines whether node 324a has child nodes such as nodes 326a, 326b, and 326n. Since node 324a has child nodes 326a, 326b, and 326n, find biggest key in sub-page logic 322 descends B+ Tree database 310 to sub-page 314a and navigates to rightmost node 326n, which would comprise the biggest key in sub-page 314a due to the exemplary organization as explained above. Find biggest key in sub-page logic 322 then determines whether node 326n has further child nodes. If node 326n has further child nodes, then find biggest key in sub-page logic 322 would descend to the next sub-page and navigate to the rightmost node within that sub-page.

However, since node 326n comprises no sub-nodes, find biggest key in sub-page logic 322 descends to the leaf level and, more specifically, the rightmost leaf 316n and determines the rightmost key value in leaf 316n. In this example, find biggest key in sub-page logic 322 would identify key "158" in leaf 316n. Find biggest key in sub-page logic 322 would then update a key index in node 326n and node 324a to be the rightmost value of "158"+1 or "159". Find biggest key in sub-page logic 322 also passes the key value of "159" to missing key search logic 320.

Missing key search logic 320 determines whether the resulted key value is bigger than searched-for key value X. If the resulted key value is smaller than or equal to the searched-for key value X, then missing key search logic 320 marks the node with the resulted key value as the current leftmost node. At initialization of missing key search logic 320, missing key search logic 320 denotes the farthest left node as the current leftmost node and the farthest right node as the current rightmost node, which is updated in the previous operation. Missing key search logic 320 then navigates to the n/2 node in main page 312, where n is the current number of nodes between a current leftmost node and a current rightmost node. That is, if there are 10 remaining nodes in main page 312, then missing key search logic 320 would navigate to the 5th of the 10 nodes thereby progressively narrowing the search area. In this example, since there are only two remaining nodes, nodes 324b and 324n, missing key search logic 320 navigates to node 324b and applies find biggest key in sub-page logic 322 in the above described manner.

If the resulted key value is bigger than the searched-for key value X, then missing key search logic 320 marks the node with the resulted key value as the current rightmost node. The missing key search logic 320 navigates to the n/2 node in current sub-page, where n is the current number of nodes between a current leftmost node and a current rightmost node. In this example, since there are only two remaining nodes, nodes 326a and 326b, missing key search logic 320 navigates to node 326a and applies find biggest key in sub-page logic 322 in the fashion described above.

That is, missing key search logic 320 re-applies find biggest key in sub-page logic 322 to node 326a. Find biggest key in sub-page logic 322 navigates to node 326a and determines whether node 326a has further child nodes. Since node 326a comprises no further sub-nodes, find biggest key in sub-page logic 322 determines the next rightmost key value in the rightmost leaf, leaf 316a. In this example, find biggest key in sub-page logic 322 would identify key "109" in leaf 316a. Find biggest key in sub-page logic 322 would then update the key index in node 326a to be the rightmost value of "109"+1 or "110". However, find biggest key in sub-page logic 322 would not update the key index in node 324a as node 324a has already been updated with the biggest key in subpage 314a as key "159". Find biggest key in sub-page logic 322 also passes the key value of "110" to missing key search logic 320.

Missing key search logic 320 again determines whether the resulted key value is bigger than searched-for key value X. If the resulted key value is bigger than the searched-for key value X, then missing key search logic 320 marks the node with the resulted key value as the current rightmost node and determines whether there is another node between the current leftmost node and the current rightmost node. Since node 326a is both the current leftmost node and the current rightmost node, missing key search logic 320 recognizes the current node as comprising the searched-for key value X. Missing key search logic 320 may then pass the data associated with the searched-for key value X to search logic 302, which may then be returned to the user.

If the resulted key value is smaller than or equal to the searched-for key value X, then missing key search logic 320 marks the node with the resulted key value as the current leftmost node. Missing key search logic 320 determines whether there is another node between the current leftmost node and the current rightmost node. If there is at least one other node between the current leftmost node and the current rightmost node, missing key search logic 320 navigates to the n/2 node in current sub-page, where n is the current number of nodes between a current leftmost node and a current rightmost node.

Since, in this example, there is another node, node 326b, missing key search logic 320 navigates to node 326b and re-applies find biggest key in sub-page logic 322. Find biggest key in sub-page logic 322 navigates to node 326b and determines whether node 326b has further child nodes. Since node 326b comprises no further sub-nodes, find biggest key in sub-page logic 322 determines the next rightmost key value in the rightmost leaf, leaf 316b. In this example, find biggest key in sub-page logic 322 would identify key "125" in leaf 316b. Find biggest key in sub-page logic 322 would then update the key index in node 326b to be the rightmost value of "125"+1 or "126". However, find biggest key in sub-page logic 322 would not update the key index in node 324a as node 324a has already been updated with the biggest key in subpage 314a as key "159". Find biggest key in sub-page logic 322 also passes the key value of "126" to missing key search logic 320.

Missing key search logic 320 again determines whether the resulted key value is bigger than searched-for key value X. If the resulted key value is bigger than the searched-for key value X, then missing key search logic 320 recognizes the current node as comprising the searched-for key value X since node 326a has been marked as the current leftmost node and node 326b is the current rightmost node. Missing key search logic 320 may then pass the data associated with the searched-for key value X to search logic 302, which may then be returned to the user.

If the resulted key value is smaller than or equal to the searched-for key value X, then missing key search logic 320 marks the node with the resulted key value as the current leftmost node. Missing key search logic 320 determines whether there is another node between the current leftmost node and the current rightmost node. Since there is no other node between the current leftmost node, node 326b and the current rightmost node, node 326n, missing key search logic 320 recognizes adjacent node 326n as comprising the searched-for key value X. Missing key search logic 320 may then retrieve the data from node 326n and pass the data associated with the searched-for key value X to search logic 302, which may then be returned to the user.

Figure 4:
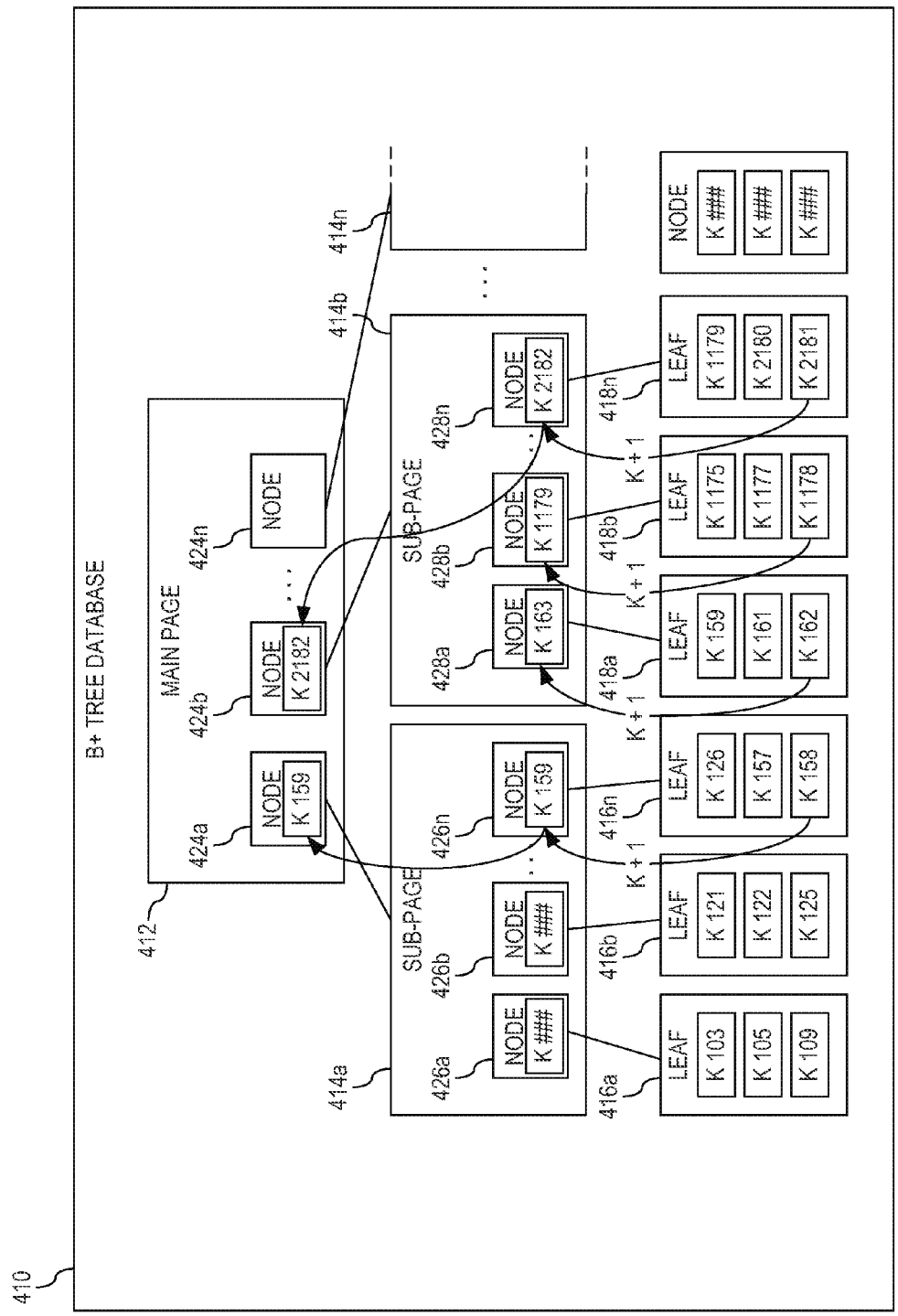
FIG. 4 depicts one example of effectively restoring data from storage when key indexes are missing from a main page and/or sub-pages associated with a B+ Tree database within the storage.

FIG. 4 depicts one example of effectively restoring data from storage when key indexes are missing from a main page and/or sub-pages associated with a B+ Tree database within the storage. When standard search logic is not able to effectively restore data from B+ Tree database 410 because key indexes in the nodes of main page 412 and sub-pages 414a, 414b, and 414n are corrupted, the search logic passes a searched-for key value X, for example key index "2180", to missing key search logic in order to find the respective data. The missing key search logic navigates to main page 412 and applies find biggest key in sub-page logic to find the greatest key value within a sub tree by looking at the data leaves. The find biggest key in sub-page logic initially navigates to the leftmost node 424a in main page 412. The find biggest key in sub-page logic determines whether node 424a has child nodes. Since node 424a has child nodes 426a, 426b, and 426n, the find biggest key in sub-page logic descends B+ Tree database 410 to sub-page 414a and navigates to rightmost node 426n, which would comprise the biggest key due to the exemplary organization of lowest to highest. The find biggest key in sub-page logic then determines whether node 426n has further child nodes.

Since node 426n comprises no sub-nodes, the find biggest key in sub-page logic descends to leaf level and, more specifically, the rightmost leaf 416n and determines the rightmost key value in leaf 416n. In this example, the find biggest key in sub-page logic would identify key "158" in leaf 416n. The find biggest key in sub-page logic would then update a key index in node 426n and node 424a to be the rightmost value of "158"+1 or "159". The find biggest key in sub-page logic also passes the key value of "159" to the missing key search logic.

The missing key search logic determines whether the resulted key value is bigger than searched-for key value X. Since the resulted key value of "159" is smaller than or equal to the searched-for key value of "2180", then the missing key search logic marks the node with the resulted key value as the current leftmost node. The missing key search logic then navigates to the n/2 node in main page 412, where n is the current number of nodes between a current leftmost node and a current rightmost node. Since there are only two remaining nodes, the missing key search logic navigates to node 424b and applies the find biggest key in sub-page logic.

The find biggest key in sub-page logic determines whether node 424b has child nodes. Since node 424b has child nodes 428a, 428b, and 428n, the find biggest key in sub-page logic descends B+ Tree database 410 to sub-page 414b and navigates to rightmost node 428n, which would comprise the biggest key due to the exemplary organization of lowest to highest. The find biggest key in sub-page logic then determines whether node 428n has further child nodes.

Since node 428n comprises no sub-nodes, the find biggest key in sub-page logic descends to leaf level and, more specifically, the rightmost leaf 418n and determines the rightmost key value in leaf 418n. In this example, the find biggest key in sub-page logic would identify key "2181" in leaf 418n. The find biggest key in sub-page logic would then update a key index in node 428n and node 424b to be the rightmost value of "2181"+1 or "2182". The find biggest key in sub-page logic also passes the key value of "2182" to the missing key search logic.

The missing key search logic determines whether the resulted key value is bigger than searched-for key value X. Since the resulted key value of "2182" is bigger than the searched-for key value of "2180", then the missing key search logic marks the node 428n with the resulted key value as the current rightmost node and navigates to the n/2 node in current sub-page, node 428*a*. The find biggest key in sub-page logic determines whether node 428*a* has child nodes. Since node 428*a* comprises no sub-nodes, the find biggest key in sub-page logic descends to leaf 418*a* and determines the rightmost key value in leaf 418*a*. In this example, the find biggest key in sub-page logic would identify key "162" in leaf 418*a*. The find biggest key in sub-page logic would then update the key index in node 428*a* to be the rightmost key value of "162"+1 or "163". The find biggest key in sub-page logic also passes the key value of "163" to the missing key search logic. The missing key search logic determines whether the resulted key value "163" is bigger than searched-for key value "2180". Since the resulted key value of "163" is smaller than the searched-for key value of "2180", then the missing key search logic marks the node 428*a* as the current leftmost node and navigates to the last remaining node in current sub-page, node 428*b*.

The missing key search logic re-applies the find biggest key in sub-page logic. The find biggest key in sub-page logic determines whether node 428*b* has further child nodes. Since node 428*b* comprises no further sub-nodes, the find biggest key in sub-page logic determines the rightmost key value in the rightmost leaf, leaf 418*b*. In this example, the find biggest key in sub-page logic identifies key "1178" in leaf 418*b*. The find biggest key in sub-page logic would then update the key index in node 428*b* to be the rightmost value of "1178"+1 or "1179". The find biggest key in sub-page logic also passes the key value of "1179" to the missing key search logic. The missing key search logic determines whether the resulted key value "1179" is bigger than searched-for key value "2180".

Since resulted key value "1179" is smaller than searched-for key value "2180", then the missing key search logic marks the node 428*a* as the current leftmost node. Additionally, since "1179" is the biggest key value in node 428*b* and since there is no other node between the current leftmost node, node 428*b*, and the current rightmost node, node 428*n*, the missing key search logic recognizes node 428*n* as comprising the searched-for key value "2180". The missing key search logic then retrieves the data from node 428*n* and passes the data associated with the searched-for key value "2180" to the standard search logic, which may then be returned to the user.

As will be appreciated by one skilled in the art, the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in any one or more computer readable medium(s) having computer usable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in a baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Computer code embodied on a computer readable medium may be transmitted using any appropriate medium, including but not limited to wireless, wireline, optical fiber cable, radio frequency (RF), etc., or any suitable combination thereof.

Computer program code for carrying out operations for aspects of the present invention may be written in any combination of one or more programming languages, including an object oriented programming language such as Java™, Smalltalk™, C++, or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to the illustrative embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions that implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions/acts specified in the flowchart and/or block diagram block or blocks.

Figure 5A:
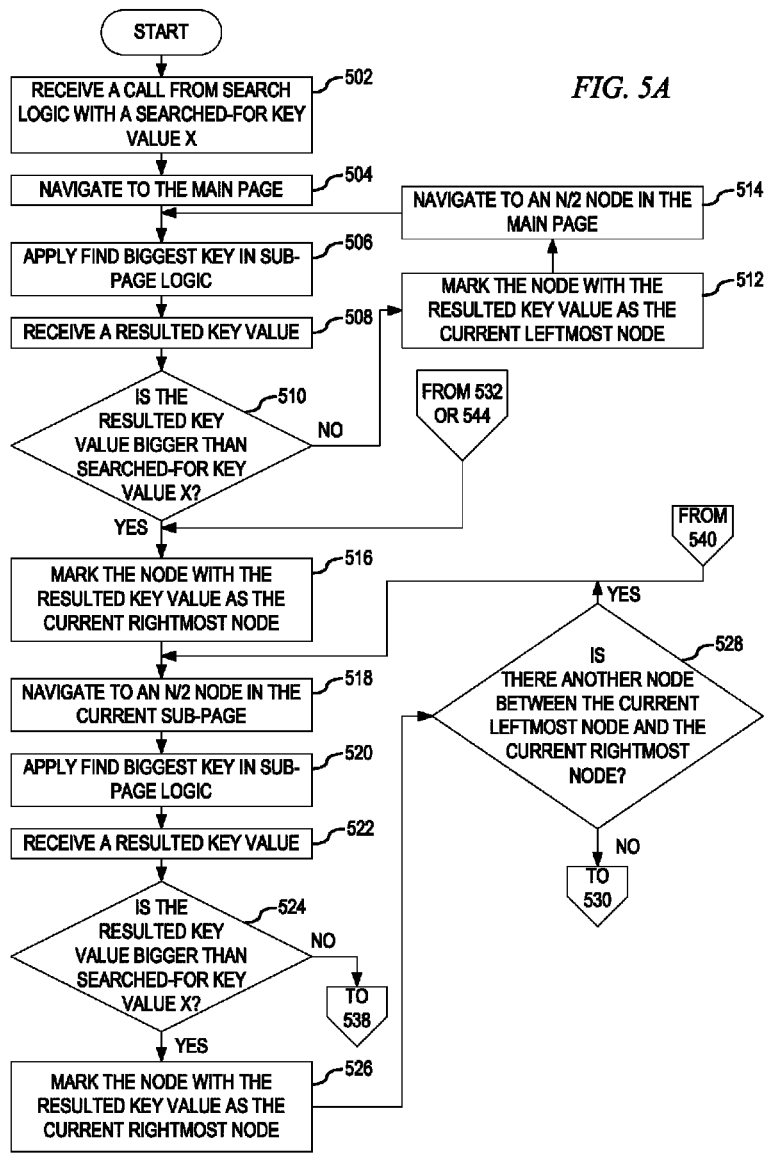
FIGS. 5A-5C depict a flowchart of the operation performed by the missing key search logic in accordance with an illustrative embodiment.
Figure 5B:
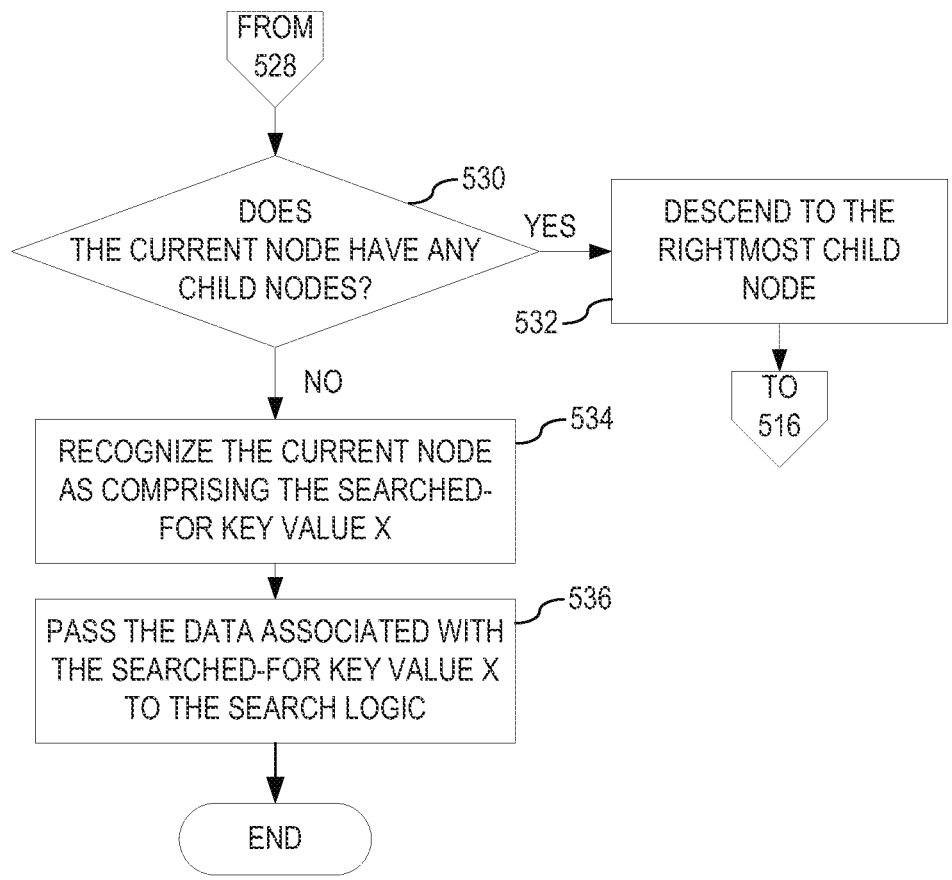
Figure 5C:
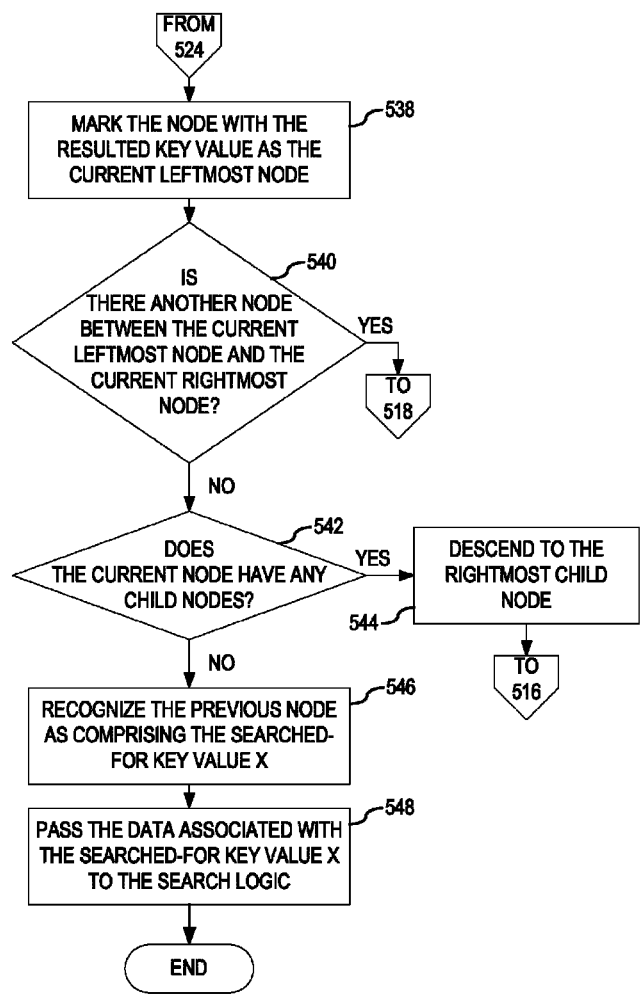

FIGS. 5A-5C depict a flowchart of the operation performed by the missing key search logic in accordance with an illustrative embodiment. As the operation begins, the missing key search logic receives a call from search logic (step 502). The missing key search logic navigates to the main page (step 504) and applies find biggest key in sub-page logic to find the greatest key value within a sub tree by looking at the data leaves (step 506), which is described in FIG. 6. The missing key search logic receives a resulted key value from the find biggest key in sub-page logic (step 508).

The missing key search logic determines whether the resulted key value is bigger than searched-for key value X (step 510). If at step 510 the resulted key value is smaller than or equal to the searched-for key value X, then the missing key search logic marks the node with the resulted key value as the current leftmost node (step 512). The missing key search logic navigates to an n/2 node in the main page, where n is the current number of nodes between a current leftmost node and a current rightmost node (step 514) with the operation returning to step 506 thereafter. If at step 510 the resulted key value is bigger than the searched-for key value X, then the missing key search logic marks the node with the resulted key value as the current rightmost node (step 516). The missing key search logic navigates to the n/2 node in current sub-page, where n is the current number of nodes between a current leftmost node and a current rightmost node (step 518) and applies the find biggest key in sub-page logic (step 520), as described in FIG. 6.

The missing key search logic receives a resulted key value from the find biggest key in sub-page logic (step 522). The missing key search logic determines whether the resulted key value is bigger than searched-for key value X (step 524). If at step 524 the resulted key value is bigger than the searched-for key value X, then the missing key search logic marks the node with the resulted key value as the current rightmost node (step 526). The missing key search logic then determines whether there is another node between the current leftmost node and the current rightmost node (step 528). If at step 528 there is another node between the leftmost node and the rightmost node, then the operation returns to step 518. If at step 528 there is not another node between the leftmost node and the rightmost node, the missing key search logic determines whether the node has any child nodes (step 530). If at step 530 there is a child node, the missing key search logic descends to the rightmost child node (step 532) and proceeds to step 516. If at step 530 there is no child node, then the missing key search logic recognizes the current node as comprising the searched-for key value X (step 534). The missing key search logic then passes the data associated with the searched-for key value X to the search logic (step 536), with the operation ending thereafter.

If at step 524 the resulted key value is smaller than or equal to the searched-for key value X, then the missing key search logic marks the node with the resulted key value as the current leftmost node (step 538). The missing key search logic determines whether there is another node between the current leftmost node and the current rightmost node (step 540). If at step 540 there is at least one other node between the current leftmost node and the current rightmost node, the operation returns to step 518. If at step 540 there is no other node between the current leftmost node and the current rightmost node, the missing key search logic determines whether the node has any child nodes (step 542). If at step 542 there is a child node, the missing key search logic descends to the rightmost child node (step 544) and proceeds to step 516. If at step 542 there are no child nodes, then the missing key search logic recognizes the previous adjacent node as comprising the searched-for key value X (step 546). The missing key search logic then passes the data associated with the searched-for key value X to the search logic (step 548), with the operation ending thereafter.

Figure 6:
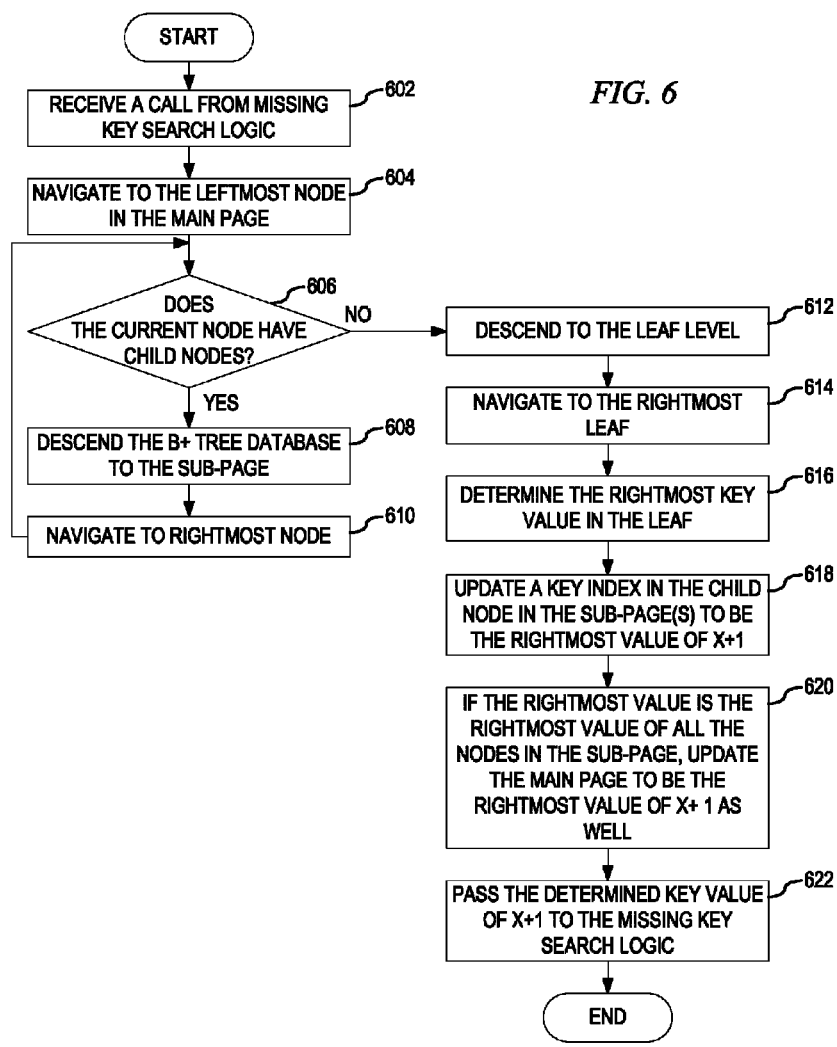
FIG. 6 depicts a flowchart of the operation performed by the find biggest key in sub-page logic in accordance with an illustrative embodiment.

FIG. 6 depicts a flowchart of the operation performed by the find biggest key in sub-page logic in accordance with an illustrative embodiment. As the operation begins, the find biggest key in sub-page logic receives a call from missing key search logic (step 602). The find biggest key in sub-page logic navigates to the leftmost node in the main page (step 604). The find biggest key in sub-page logic determines whether the current node has child nodes (step 606). If at step 606 the current node has child nodes, then the find biggest key in sub-page logic descends the B+ Tree database to the sub-page (step 608) and navigates to rightmost node, which would comprise the biggest key in the sub-page node (step 610), with the operation returning to step 606.

If at step 606 the current node has no child nodes, the find biggest key in sub-page logic descends to the leaf level (step 612) and navigates to the rightmost leaf (step 614). The find biggest key in sub-page logic then determines the rightmost key value in the leaf (step 616). After identifying the rightmost key value of the leaf, the find biggest key in sub-page logic updates a key index in the child node in the sub-page(s) to be the rightmost value of X+1 (step 618) and, if the rightmost value is the rightmost value of all the nodes in the sub-page, updates the main page to be the rightmost value of X+1 as well (step 620). The find biggest key in sub-page logic also passes the determined key value of X+1 to the missing key search logic (step 622), with the operation ending thereafter.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, the illustrative embodiments provide mechanisms for efficiently searching B+ Tree leaves where the actual data and full keys exist in order to retrieve data associated with the key and to rebuild key indexes at the B+ Tree node level if all or some of the B+ Tree nodes have unidentifiable keys because of corruption. Since data in the B+ Tree exists in numerical order of the nodes, the mechanism identifies a specific data leaf where the data is stored by progressively narrowing the search area. Once the data leaf containing the data is identified, the data is retrieved and the key indexes at the B+ Tree node levels are updated.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method, in a data processing system, for efficiently searching a database for data associated with a key value that is unidentifiable in a set of nodes of the database, the method comprising:
   receiving a request to retrieve data from the database, wherein the request specifies a searched-for key value;
   identifying the data associated with the searched-for key value in a lowest level node of the database between a current leftmost node and a current rightmost node, wherein identifying the data associated with the searched-for key value in the lowest level node of the database comprises:
   navigating to a current page of the database;
   applying logic to determine a biggest key value in a sub-page lowest level node resulting in a resulted key value;
   responsive to receiving the resulted key value, determining whether the resulted key value is bigger than the searched-for key value;
   responsive to the resulted key value being bigger than the searched-for key value, marking a current node as the current rightmost node;
   determining whether there is a set of nodes existing between the current leftmost node and the current rightmost node;
   responsive to the set of nodes existing between the current leftmost node and the current rightmost node, navigating to a n/2 node in the current page;
   re-applying the logic to determine a biggest key value in a different sub-page lowest level node;
   responsive to no other node existing between the current leftmost node and the current rightmost node, determining whether the current node has any child nodes;
   responsive to the current node failing to have any child nodes, recognizing the current node as comprising the searched-for key value;
   updating the key index in the current node of the database with the key index value identified from the sub-page lowest level node thereby making the searched-for key value identifiable within the current node; and
   returning the data associated with the searched-for key value;
   updating a key index in at least one node of the database with the key index value associated with the data and identified from the lowest level node thereby making the searched-for key value identifiable within the at least one node; and
   returning the data associated with the searched-for key value to a user.

2. The method of claim 1, further comprising:
   responsive to the current node having at least one child node, descending to a rightmost child node;
   marking a current node as the current rightmost node; and
   re-applying the logic to determine a biggest key value in a different sub-page lowest level node.

3. The method of claim 1, further comprising:
   responsive to the resulted key value being smaller than or equal to the searched-for key value, marking the current node as the current leftmost node;
   determining whether there is a set of nodes between the current leftmost node and the current rightmost node;
   responsive to no other node existing between the current leftmost node and the current rightmost node, recognizing an adjacent node as comprising the searched-for key value;
   updating the key index in the adjacent node of the database with the key index value identified from the sub-page lowest level node thereby making the searched-for key value identifiable within the adjacent node; and
   returning the data associated with the searched-for key value.

4. The method of claim 3, further comprising:
   responsive to the set of nodes existing between the current leftmost node and the current rightmost node, navigating to a n/2 node in the current page; and
   re-applying the logic to determine a biggest key value in a different sub-page lowest level node.

5. The method of claim 1, wherein applying the logic to determine the biggest key value in the sub-page lowest level node comprises:
   navigating to a leftmost node in the current page, thereby forming the current node;
   determining whether the current node has at least one child node;
   responsive to the current node failing to have a child node, descending to the lowest level node associated with the leftmost node;
   identifying the rightmost key value associated with the lowest level node;
   adding 1 to the rightmost key value thereby forming a key index value; and
   updating the key index in the leftmost node with the key index value identified from the lowest level node thereby making the searched-for key value identifiable within the leftmost node, wherein the searched-for key value was unidentifiable prior to updating the key index due to a corruption of the key index because of at least one of a software defect or a hardware defect in an upper management layer of the database.

6. The method of claim 5, further comprising:
responsive to the current node having at least one child node, descending to a sub-page associated with the at least one child node;
navigating to the rightmost node of the sub-page thereby forming the current node; and
re-determining whether the current node has at least one child node.

7. A computer program product comprising a computer readable storage medium having a computer readable program stored therein, wherein the computer readable program, when executed on a computing device, causes the computing device to:
receive a request to retrieve data from a database, wherein the request specifies a searched-for key value;
identify the data associated with the searched-for key value in a lowest level node of the database between a current leftmost node and a current rightmost node, wherein the computer readable program to identify the data associated with the searched-for key value in the lowest level node of the database further causes the computing device to:
navigate to a current page of the database;
apply logic to determine a biggest key value in a sub-page lowest level node resulting in a resulted key value;
responsive to receiving the resulted key value, determine whether the resulted key value is bigger than the searched-for key value;
responsive to the resulted key value being bigger than the searched-for key value, mark a current node as the current rightmost node;
determine whether there is a set of nodes existing between the current leftmost node and the current rightmost node;
responsive to the set of nodes existing between the current leftmost node and the current rightmost node, navigate to a n/2 node in the current page;
re-apply the logic to determine a biggest key value in a different sub-page lowest level node;
responsive to no other node existing between the current leftmost node and the current rightmost node, determine whether the current node has any child nodes;
responsive to the current node failing to have any child nodes, recognize the current node as comprising the searched-for key value;
update the key index in the current node of the database with the key index value identified from the sub-page lowest level node thereby making the searched-for key value identifiable within the current node; and
return the data associated with the searched-for key value;
update a key index in at least one node of the database with the key index value associated with the data and identified from the lowest level node thereby making the searched-for key value identifiable within the at least one node; and
return the data associated with the searched-for key value to a user.

8. The computer program product of claim 7, wherein the computer readable program further causes the computing device to:
responsive to the current node having at least one child node, descend to a rightmost child node;
mark a current node as the current rightmost node; and
re-apply the logic to determine a biggest key value in a different sub-page lowest level node.

9. The computer program product of claim 7, wherein the computer readable program further causes the computing device to:
responsive to the resulted key value being smaller than or equal to the searched-for key value, mark the current node as the current leftmost node;
determine whether there is a set of nodes between the current leftmost node and the current rightmost node;
responsive to no other node existing between the current leftmost node and the current rightmost node, recognize an adjacent node as comprising the searched-for key value;
update the key index in the adjacent node of the database with the key index value identified from the sub-page lowest level node thereby making the searched-for key value identifiable within the adjacent node;
return the data associated with the searched-for key value;
responsive to the set of nodes existing between the current leftmost node and the current rightmost node, navigate to a n/2 node in the current page; and
re-apply the logic to determine a biggest key value in a different sub-page lowest level node.

10. The computer program product of claim 7, wherein the computer readable program to apply the logic to determine the biggest key value in the sub-page lowest level node further causes the computing device to:
navigate to a leftmost node in the current page, thereby forming the current node;
determine whether the current node has at least one child node;
responsive to the current node failing to have a child node, descend to the level node associated with the leftmost node;
identify the rightmost key value associated with the lowest level node;
add 1 to the rightmost key value thereby forming a key index value;
update the key index in the leftmost node with the key index value identified from the lowest level node thereby making the searched-for key value identifiable within the leftmost node, wherein the searched-for key value was unidentifiable prior to updating the key index due to a corruption of the key index because of at least one of a software defect or a hardware defect in an upper management layer of the database;
responsive to the current node having at least one child node, descend to a sub-page associated with the at least one child node;
navigate to the rightmost node of the sub-page thereby forming the current node; and
re-determine whether the current node has at least one child node.

11. An apparatus, comprising:
a processor; and
a memory coupled to the processor, wherein the memory comprises instructions which, when executed by the processor, cause the processor to:
receive a request to retrieve data from a database, wherein the request specifies a searched-for key vale;
identify the data associated with the searched-for key value in a lowest level node of the database between a current leftmost node and a current rightmost node, wherein the instructions to identify the data associated with the searched-for key value in the west level node of the database further cause the processor to:
- navigate to a current page of the database;
- apply logic to determine a biggest key value in sub-page lowest level node resulting in a resulted key value;
- responsive to receiving the resulted key value, determine whether the resulted key value is bigger than the searched-for key value;
- responsive to the resulted key value being bigger than the searched-for value, mark a current node as the current rightmost node;
- determine whether there is a set of nodes existing between the current leftmost node and the current rightmost node;
- responsive to the set of nodes existing between the current leftmost node and the current rightmost node, navigate to a n/2 node in the current page;
- re-apply the logic to determine a biggest key value in a different sub-page lowest level node;
- responsive to no other node existing between the current leftmost node and the current rightmost node, determine whether the current node has any child nodes;
- responsive to the current node failing to have any child nodes, recognize the current node as comprising the searched-for key value;
- update the key index in the current node of the database with the key index value identified from the sub-page lowest level node thereby making the searched-for key value identifiable within the current node; and
- return the data associated with the searched-for key value;

update a key index in at least one node of the database with the key index value associated with the data and identified from the lowest level node thereby making the searched-for key value identifiable within the at least one node; and
return the data associated with the searched-for key value to a user.

12. The apparatus of claim 11, wherein the instructions further cause the processor to:
- responsive to the current node having at least one child node, descend to a rightmost child node;
- mark a current node as the current rightmost node; and
- re-apply the logic to determine a biggest key value in a different sub-page lowest level node.

13. The apparatus of claim 11, wherein the instructions further cause the processor to:
- responsive to the resulted key value being smaller than or equal to the searched-for key value, mark the current node as the current leftmost node;
- determine whether there is a set of nodes between the current leftmost node and the current rightmost node;
- responsive to no other node existing between the current leftmost node and the current rightmost node, recognize an adjacent node as comprising the searched-for key value;
- update the key index in the adjacent node of the database with the key index value identified from the sub-page lowest level node thereby making the searched-for key value identifiable within the adjacent node;
- return the data associated with the searched-for key value;
- responsive to the set of nodes existing between the current leftmost node and the current rightmost node, navigate to a n/2 node in the current page; and
- re-apply the logic to determine a biggest key value in a different sub-page lowest level node.

14. The apparatus of claim 11, wherein the instructions to apply the logic to determine the biggest key value in the sub-page lowest level node further cause the processor to:
- navigate to a leftmost node in the current page, thereby forming the current node;
- determine whether the current node has at least one child node;
- responsive to the current node failing to have a child node, descend to the lowest level node associated with the leftmost node;
- identify the rightmost key value associated with the lowest level node;
- add 1 to the rightmost key value thereby forming a key index value;
- update the key index in the leftmost node with the key index value identified from the lowest level node thereby making the searched-for key value identifiable within the leftmost node, wherein the searched-for key value was unidentifiable prior to updating the key index due to a corruption of the key index because of at least one of a software defect or a hardware defect in an upper management layer of the database;
- responsive to the current node having at least one child node descend to a sub-page associated with the at least one child node;
- navigate to the rightmost node of the sub-page thereby forming the current node; and
- re-determine whether the current node has at least one child node.

* * * * *